Patented Dec. 11, 1951

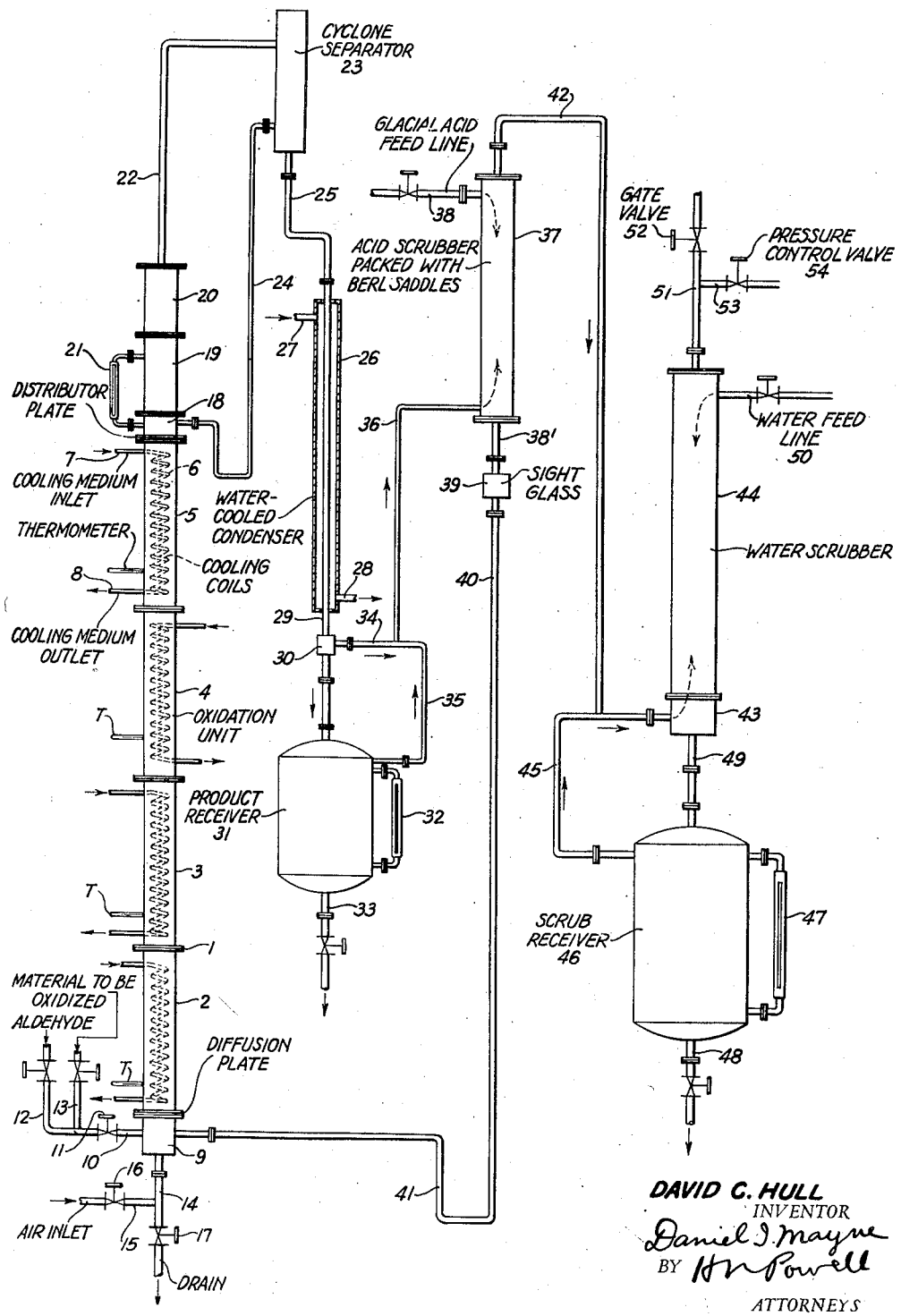

2,578,306

UNITED STATES PATENT OFFICE 2,578,306

PROCESS FOR DIRECT OXIDATION OF ALDEHYDES AND ALCOHOL TO ACID

David C. Hull, Kingsport, Tenn., assignor to Eastman Kodak Company, Rochester, N. Y., a corporation of New Jersey Application January 19, 1950, Serial No. 139,472

7 Claims. (Cl. 260—531)

This invention relates to improvements in processes for oxidizing organic compounds in the presence of an aldehyde-activated catalyst. More particularly, this invention is concerned with improved procedure and catalyst for direct and continuous processes for the oxidation of alcohols and aldehydes to acids, the reaction being carried out in the presence of an aldehyde-activated combination catalyst.

Processes for the direct oxidation of various organic compounds have been described in my Patents 2,287,803; 2,353,157; 2,353,159; 2,353,160; 2,425,878; 2,425,879; 2,425,880; 2,425,881; 2,425,- 882; 2,354,683, and other of my patents and pending applications.

As indicated, in my prior companion patents and applications I have described processes and catalysts whereby various organic compounds may be oxidized quite efficiently. For example, referring to the direct oxidization of ethyl alcohol to acetic acid and in the presence of aldehyde-activated cobalt acetate as a catalyst, there has been disclosed processes whereby in excess of 90% yields of acetic acid may be obtained. Of the losses encountered in processes operated in accordance with my prior inventions, a certain percentage of the losses may be attributed to mechanical problems. That is, for example, 1 or 2% loss may be due to pump leakage or the like equipment or mechanical difficulties which may be experienced in large scale commercial operations. Another portion of the losses may be observed from the oxides of carbon escaping in the waste gases, such as the carbon dioxide content thereof. In other words, the carbon dioxide content of the vented gases may be considered to some extent an index of a direct loss in the process, evidencing that a portion of the organic compound undergoing processing is being decomposed to oxides of carbon rather than being converted into the desired final products.

While, as indicated above in the processes of my prior inventions, the efficiency of the oxidation has in many instances exceeded 90%, it has now been discovered that by the procedure of the present invention, the efficiency of the process may be still further improved. That is, by the procedure of the present invention, it has now been found possible to reduce the losses due to decomposition, thereby rendering the overall process more efficient and giving still better yields of the desired product.

In carrying out the present invention, the apparatus which may be used and many of the steps and other features are the same or similar to the corresponding items disclosed in my earlier patents. Therefore, on these corresponding and similar features only the general description will be set forth herein as any additional details pertaining thereto may be obtained by referring to my companion patents already listed.

In accordance with the present invention, the oxidation processes may be carried out either batchwise or continuously, continuous operation being preferred. The pressure of operation may be within the range of from normal atmospheric pressure up to 10 atmospheres, the range of 1 to 2 atmospheres being preferred in most instances. The temperatures of operation may be between 5–150° C., the more limited range of 70–110° C. being preferred in most instances.

As in the operation of my earlier processes, an elongated reaction column suitably equipped with inlet and outlet conduits, condensers, and scrubbers and the like as shown in several of my patents listed above may be used.

One type of apparatus is shown in the attached drawing forming a part of the present application. Referring to this drawing, which is a semi-diagrammatic side elevation view of the equipment, 2, 4, and 5 represent vertically extending oxidation column sections bolted together in the conventional manner at section joints exemplified by 1. The interior of the column may be provided with temperature controlling coils, 6, to which cooling medium and the like may be introduced at 7 and withdrawn at 8.

The lower portion of the column is provided with a base, 9, containing a diffusion plate and connected with a plurality of valved conduits as indicated at 10, 11, 12, 13, 14, 15, 16 and 17, through which the organic material to be oxidized, oxidizing medium, and the like can be supplied.

Referring to the upper portion of the column, there is provided a distributor plate section 18, and adjacent section 19, provided with a sight glass, 21, by which means the liquid level may be observed in the top section 20. Leading from the upper portion of the column is a vapor outlet conduit, 22, which leads through a cyclone separator, 23. Catalyst particles and the like separated out by this device may be returned to the oxidation unit through conduit 24. Also leading from separator 23, is the conduit, 25, which passes through the water-cooled condenser made up of the parts 26, 27, 28 and 29, the condenser being attached to the junction box 30.

Positioned below these parts is the receiver, 31, which is provided with a liquid level indicating device, 32, as well as conduit, 33. The receiver is also provided with conduit, 35, which connects with conduit, 36, whereby uncondensed components flow to scrubber, 37. Scrubber, 37, is provided with an inlet, 38, for glacial acetic acid or other comparable dry anhydrous scrubbing liquid, preferably the acid in which the catalyst is dissolved. The scrubber discharges through 38', 39, and conduits 40 and 41, back to the oxidation unit.

The components not removed in scrubber, 37, pass through conduit 42 which leads to a water scrubber system made up of parts, 43, 44, 45, 46, 47, 48, and 49. The function of these various parts, such as part 47, being the liquid level indicator, are apparent from the drawing. The scrubbing water is introduced through conduit 50 into the upper portion of scrubber 44. The components still not removed by this scrubbing treatment enter conduits 51 and 53, which are adapted to be controlled so as to be operated under increased pressure by means of valves 52 and 54. This increased pressure carries back through the entire system.

The particular conduit arrangement involving conduit 45 is provided for vapor flow as shown by the arrows, so that any entrained vapors carried into receiver, 46, may escape back through the scrubber.

This oxidation unit is filled, for example, ⅔ to ¾ full of catalyst solution which will be described in detail hereinafter. The catalyst solution is activated and the organic compound to be oxidized together with aldehyde and a source of oxidizing medium, such as air, passed through the catalyst solution. The temperature of the oxidation is controlled by the introduction of a cooling medium as disclosed in the drawing.

In accordance with my present invention, a catalyst is prepared by dissolving a certain amount of the catalyst salt in organic acid, such as 2% cobalt acetate in acetic acid. This solution is activated by feeding in an aldehyde such as acetaldehyde and air until the oxidation of the aldehyde is proceeding readily. There is also usually a color change in the catalyst solution which indicates activation has taken place. In carrying out this activation it may be temporarily desirable to apply a certain amount of heat for aiding in initiating the activation of the catalyst. More of the catalyst material, such as more cobalt acetate, may be added to the solution until a saturated solution of the catalyst component in the organic acid is obtained. During this addition of further catalyst component, the supplying of the activating aldehyde along with air may be continued.

When a catalyst solution prepared as just described shows a high degree of activity which is indicated by 95–97% conversion of the aldehyde to acid in one pass, in accordance with the present invention I have found that by adding a small content of chromium acetate or other source of chromium, for example, in an amount equal to about 0.05–0.1% of the catalyst solution, that the overall continuous oxidation process will be materially improved. Further details concerning this improvement step of the process will be apparent from the description which follows. That is, the improvement secured by this small addition of a source of chromium to the catalyst solution is evidenced by a reduced amount of carbon dioxide in the off gases over long periods of continuous operation.

With further reference to the improved catalyst solution of the present invention, the first-added catalyst component exemplified by cobalt acetate, while indicated above as being in an amount from approximately 2% to saturation, may vary from 0.1% to saturation, the preferred operating range being 3% to 5%. The addition of the source of chromium to the catalyst solution may vary from 0.01% to 2%, the preferred concentrations being in the range of .05–0.15%. While I have mentioned cobalt acetate and chromium acetate as exemplary compounds, various other derivatives may be used, and my invention is not restricted to these particular compounds. As described in my earlier patents, the oxides, halides and the like derivatives may be used. While the acetate derivatives of the catalyst components constitute a convenient commercially-available source of the catalyst components, there are numerous other sources of the components which may be used.

For example, the hydroxides of the catalyst component and chromium are generally sufficiently soluble to give at least 0.5% thereof in the catalyst solution, and may be used.

While in the above description I have referred specifically to cobalt and this is preferred, combinations of the various other catalyst components described in my several patents referred to above varying from the rare earths described in my Patent 2,425,878 to silver of my Patent 2,425,879 may be used. In general, the combination of a small amount of chromium with these catalyst components exhibits improvement although as mentioned, the preferred combination is a catalyst containing cobalt improved with the chromium.

Likewise, while I have referred to dissolving the catalyst component in acetic acid, various other acids may be used such as butyric, propionic and the like. Similar remarks apply to the aldehyde activating medium, rather than employing acetaldehyde, butyraldehyde might be used. In general, however, by employing all components having the same radical such as the acetyl radical of acetic acid, acetaldehyde and cobalt acetate, I have found that my process is simplified in that there is less chance for the formation of by-products which might involve separatory considerations.

With further respect to the more general aspects of my invention when operating the direct and continuous oxidation processes employing the novel combination catalyst just described; namely, a catalyst containing a small content of chromium, I have found that the decomposition losses as evidenced by the amount of carbon dioxide in the off gases may be reduced several fold. Conversely, by reducing the decomposition losses the overall efficiency of the process is improved, thereby permitting the production of great deals of the desired oxidation product.

*Example I*

A catalyst was prepared by adding 40 grams of cobalt acetate to 1,909 grams of acetic acid. Activation of the catalyst was carried out by feeding acetaldehyde and air into an oxidation column containing the catalyst solution. When the catalyst was active, a run was made at atmospheric pressure and at 60–70° C. A total of 909 grams of acetaldehyde was fed to the unit and 73 cubic feet of air was passed through. From the amount of carbon dioxide in the off gas, there was a loss of 3.4% of the acetaldehyde by decomposition. The yield in this case was 94.5%, the difference of 2% being in mechanical losses.

After making the above run, 10 grams of chromium acetate was added to the catalyst solution. In one hour's time the carbon dioxide content of the gas dropped to about ½ of what it was running before. A total of 3040 grams of acetaldehyde was fed to the unit along with 228 cubic feet of air. Decomposition losses in the off gas accounted for 1.5% of the acetaldehyde fed. This shows a decrease in decomposition losses of 56%. The yield in this case was 97%, the difference of 1.5% being in mechanical losses.

*Example II*

Another run was made with a new catalyst as a check on Example I. It was made up by dissolving 37 grams of cobalt acetate in 1850 grams of glacial acetic acid. The catalyst was activated in the usual manner, and the run was made at atmospheric pressure and 60–70° C. A total of 558 grams of acetaldehyde was fed into the unit while 49 cubic feet of air was added. By off-gas analysis, 4.25% of the aldehyde fed was lost by decomposition. The yield in this case was 94%, the remaining loss in yield being due to mechanical losses. Ten grams of chromium acetate was then added, and 835 grams of acetaldehyde was fed into the unit while 65 cubic feet of air was added. The loss of aldehyde due to decomposition in this case was only 1.5% and the yield was 97.5%. By adding chromium acetate to the catalyst the decomposition losses were decreased by 65%.

*Example III*

A new catalyst solution was made up for a production unit by adding 500 pounds of cobalt acetate to 15,000 pounds of glacial acetic acid. The catalyst was activated and the unit was run several days with a feed ratio of 11 mols of ethyl alcohol and 89 mols of acetaldehyde. The unit was operating at 20 pounds pressure. The loss of material expressed as ethyl alcohol due to decomposition was 4.6 pounds of ethyl alcohol per 100 pounds of acetic acid produced. This loss represents a yield of 94% on oxidation. Twenty pounds of chromium acetate was added to this unit, which is approximately 0.13%, and within a few hours, the loss on the basis of ethyl alcohol was 2.9 pounds per hundred pounds of acid produced. This represents a decrease in decomposition losses of 37% and a yield of 96.2% on oxidation. The molar ratio of alcohol to aldehyde feed was still 11 to 89 and the pressure was 20 pounds per square inch gage.

*Example IV*

On another oxidation unit used on regular acetic acid production, a catalyst was made up by adding 500 pounds of cobalt acetate to 15,000 pounds of glacial acid. The catalyst was activated in the usual manner by feeding acetaldehyde and air to the unit. When the catalyst was active a molar ratio of 30 ethyl alcohol to 70 acetaldehyde was fed to unit at 20 pounds pressure. The loss from decomposition in terms of ethyl alcohol was 3.0 pounds per 100 pounds of acid made. Fifty pounds of chromium acetate was added to the catalyst one day and another 50 pounds the next day. After the first addition of chromium acetate there was a marked decrease in decomposition losses and the second addition did not improve much. The decomposition losses after addition of chromium acetate average 1.7 pounds of ethyl alcohol per 100 pounds of acid produced or decrease in decomposition losses of 43%. The yield on oxidation was increased from 96.1% to 97.8%.

*Example V*

On still another oxidation unit used on regular production of acetic acid a catalyst was made in a similar manner as described in the previous example. After activation of the cobalt catalyst a molar ratio of 38 ethyl alcohol to 62 acetaldehyde was fed to the unit while operating at a pressure of 20 pounds per square inch. The decomposition loss in terms of ethyl alcohol during this time was 3.2 pounds per 100 pounds of acid produced which is a yield of 95.8% on oxidation. Twenty pounds of chromium acetate was then added which is 0.13% chromium acetate, and within three hours there was a very decided change in decomposition losses as indicated by the decreased amount of carbon dioxide in the off-gas. The loss dropped to 1.9 pounds of ethyl alcohol, per 100 pounds of acid produced which is a decrease of 40.5%. The yield on oxidation was increased to 97.5%.

While the above examples have been directed principally to ethyl alcohol and acetaldehyde, other compounds may be advantageously processed in the presence of my combination catalyst.

*Example VI*

In accordance with this example, chromium acetate has also been helpful in decreasing decomposition losses in the oxidation of butyraldehyde and butanol. In an oxidation unit used in the regular production of butyric acid which contained a cobalt catalyst and operated in a manner analogous to the preceding examples, the loss as indicated by the carbon dioxide in the off gas was several per cent. After adding chromium acetate to the extent of 0.14% of the catalyst liquor in the unit, the yield of product was increased to above 90%. In further detail the average carbon dioxide in the off gas for fifteen day period prior to adding chromium acetate was about 3.7% corresponding to an 88.5% yield of butyric acid. After adding chromium acetate, the average carbon dioxide for nine days in the off gas reduced to 3.2% indicating an increase in yield to over 90%.

In a similar manner, the secondary alcohols referred to in my companion patent, 2,354,683, may be processed in the presence of the combination chromium containing catalyst described in Examples I—VI above. In general, it has been found that all of the lower aliphatic alcohols and aldehydes may be oxidized directly and more efficiently to the acids in the presence of aldehyde-activated catalyst containing a content of chromium as has been described in detail above. While it is preferred to use chromium acetate or at least a derivative having the same or similar radical with respect to the oxidation product under manufacture, other sources of chromium as indicated above such as hydroxide and the like can be used.

As apparent from the preceding description, one of the major advantages of the present invention is that it permits operation with less decomposition or losses of the materials to the formation of carbon dioxide, and this gives a higher yield. In addition to the advantage of reduced losses with respect to carbon dioxide formation, the improved combination catalyst of the present invention in certain instances permits the greater production of a certain oxidation product. An example of this is in the oxidation of butyraldehyde and butyl alcohol where both butyric acid and acetic acid are obtained. When using the improved combination catalyst of the present invention, there is a greater ratio of butyric acid with respect to the formation of acetic acid, thereby indicating that the oxidation may be directed so that it does not proceed so far that a portion of the butyl radical is not being converted to acetyl.

I claim:

1. A process for oxidizing lower aliphatic alcohols directly and continuously which comprises contacting the lower aliphatic alcohol with an aldehyde activated combination catalyst which contains as essential ingredients contents of both cobalt and chromium ions, the combination catalyst being characterized in that the cobalt content is present from a small amount to saturation and is at least four times the chromium content, at the time of contacting the alcohol with the combination catalyst also passing lower aliphatic aldehyde and a gas containing free oxygen into the reaction whereby the alcohol is oxidized, withdrawing catalyst and product from the process and separating and returning the combination catalyst to the process.

2. A process of oxidizing lower aliphatic alcohol from the group consisting of ethyl, propyl, and butyl alcohols to the corresponding lower aliphatic acid which comprises substantially continuously contacting the lower aliphatic alcohol with a catalyst solution containing an activated combination catalyst, also substantially continuously passing through the catalyst solution a lower aliphatic aldehyde and a gas containing free oxygen, the process being characterized in that the catalyst solution comprises a small concentration of chromium of the formula $Cr_2(C_2H_3O_2)_6 2H_2O$ in the presence of cobalt ions, the combination catalyst being characterized in that the cobalt component present is at least four times the amount of chromium component, whereby any loss due to decomposition of the lower aliphatic alcohol to carbon dioxide is minimized.

3. A process for the direct and continuous conversion of ethyl alcohol to acetic acid which comprises continuously supplying the ethyl alcohol into contact with an aldehyde activated catalyst solution containing both cobalt and chromium components, the catalyst solution being characterized in that the amount of the cobalt component is at least four times the amount of chromium component, also substantially continuously supplying lower aliphatic aldehyde and a gas containing free oxygen into contact with the catalyst solution, maintaining the temperature of the process between 70–110° C. and under a pressure between normal atmospheric pressure and 10 atmospheres.

4. The process in accordance with claim 3 wherein acetic acid formed in the process is continuously separated as a vapor together with any catalyst entrained therein, the entrained catalyst is separated and returned to the oxidation, the uncondensed components are subjected to a scrubbing with a relatively dry acid scrubbing medium which scrubbing medium is conducted to the catalyst solution of the oxidation step.

5. The process which comprises substantially continuously passing butyl alcohol into contact with an aldehyde activated catalyst solution which contains as essential components both cobalt and chromium ions in solution in a lower aliphatic acid, the catalyst being characterized in that the amount of the cobalt component is at least four times the amount of the chromium component, substantially continuously passing through the catalyst solution during the oxidation of the butyl alcohol a lower aliphatic aldehyde and a gas containing free oxygen and maintaining the catalyst solution at a temperature between 70° C. and the boiling point of butyric acid.

6. The process for the direct and continuous oxidation of propyl alcohol which comprises passing the propyl alcohol into contact with an aldehyde activated catalyst solution containing both a cobalt and a chromium component, the catalyst solution being characterized in that cobalt is present in an amount up to saturation of the catalyst solution and that the amount of cobalt component is at least four times the amount of the chromium component and also during the process passing a lower aliphatic aldehyde and a gas containing free oxygen to the catalyst solution.

7. An improved oxidation process for the direct oxidation of lower aliphatic alcohols for producing the corresponding organic acid therefrom, whereby the oxidation process is improved in that losses due to decomposition of the alcohol to carbon dioxide are minimized which comprises incorporating a liquid oxidation combination catalyst in an oxidation zone to a predetermined level, said liquid catalyst containing as essential components the combination comprising a cobalt content from a small amount to saturation of the solution and a chromium content from 0.01 to 2%, the combination catalyst being further characterized in that the cobalt component is at least four times the chromium component, said combination catalyst being carried in a lower aliphatic acid liquid, passing lower aliphatic aldehyde and gaseous oxidizing medium through said combination catalyst while passing the alcohol therethrough, maintaining the aforesaid oxidation process under a pressure between atmospheric and ten atmospheres and at a temperature between 5 and 150° C. whereby the alcohol is caused to be oxidized to acid, withdrawing and condensing under elevated pressure the organic acid produced by the aforesaid oxidation and during the operation of the aforesaid oxidation process adding glacial acid to the process so that the glacial acid mixes with the catalyst liquid containing the aforesaid combination of the two components.

DAVID C. HULL.

REFERENCES CITED

The following references are of record in the file of this patent:

UNITED STATES PATENTS

| Number | Name | Date |
|---|---|---|
| 2,265,948 | Loder | Dec. 9, 1941 |
| 2,287,803 | Hull | June 30, 1942 |
| 2,353,160 | Hull | July 11, 1944 |

FOREIGN PATENTS

| Number | Country | Date |
|---|---|---|
| 100,180 | Switzerland | July 2, 1923 |

OTHER REFERENCES

Keyes et al.: "The Catalytic Partial Oxidation of Ethyl Alcohol," Univ. of Illinois Bulletin No. 238, vol. 29, No. 19, pp. 19-20 (1931).